United States Patent [19]
Cook

[11] Patent Number: 5,257,381
[45] Date of Patent: Oct. 26, 1993

[54] METHOD OF INTERCEPTING A GLOBAL FUNCTION OF A NETWORK OPERATING SYSTEM AND CALLING A MONITORING FUNCTION

[75] Inventor: Colin Cook, Orem, Utah
[73] Assignee: Intel Corporation, Santa Clara, Calif.
[21] Appl. No.: 843,549
[22] Filed: Feb. 28, 1992
[51] Int. Cl.⁵ .......................... G06F 9/40; G06F 12/14
[52] U.S. Cl. ............................. 395/700; 364/DIG. 1; 364/280.8; 364/222.81; 364/286.6
[58] Field of Search .......................................... 395/700

[56] References Cited
U.S. PATENT DOCUMENTS 4,780,821 10/1988 Crossley .................. 364/200

Primary Examiner—Gareth D. Shaw
Assistant Examiner—A. Katbab
Attorney, Agent, or Firm—Blakely, Sokoloff, Taylor & Zafman

[57] ABSTRACT

A method of enhancing the functionality of operating systems by providing an interface between the operating system and new, enhanced functions is described. This is done by intercepting calls to global functions. The first few instructions of a global function are overwritten with an instruction to jump to an interceptor function. When jumped to the interceptor function, which calls a monitoring function, which performs some analysis and enhances the functionality of the operating system. Afterward, the interceptor function returns to the global function.

17 Claims, 4 Drawing Sheets

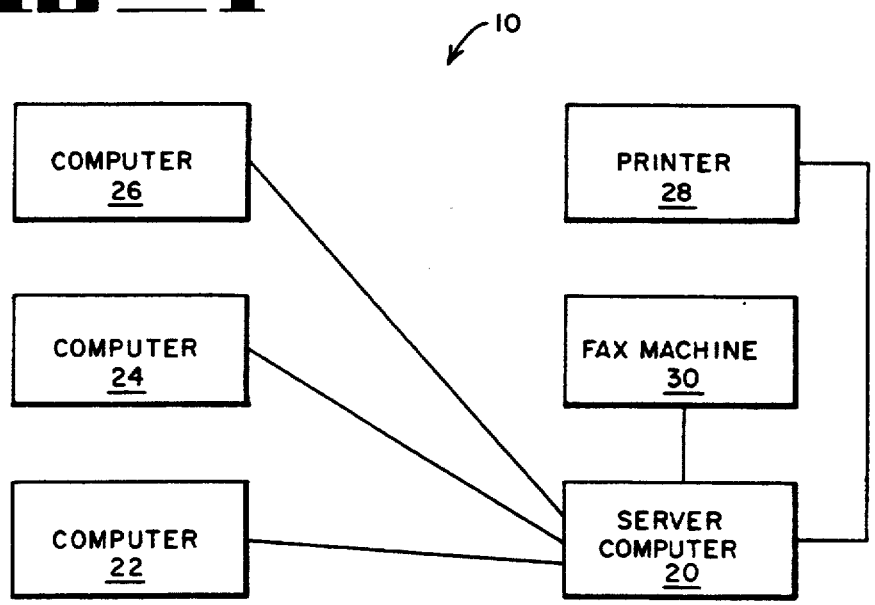
FIG_1
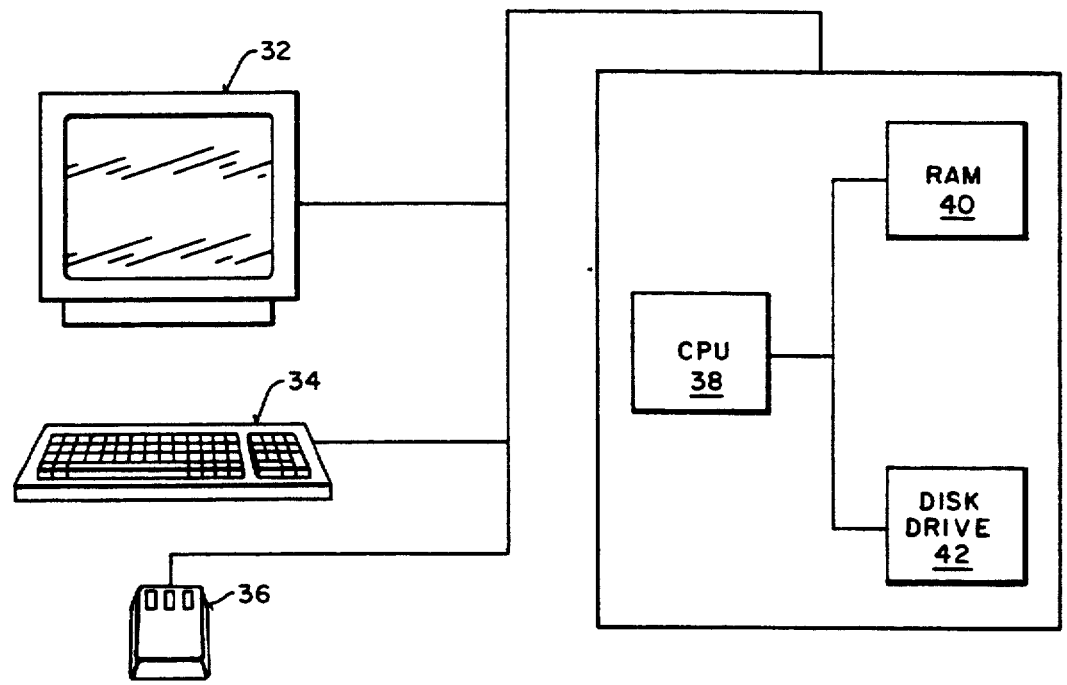
FIG_2

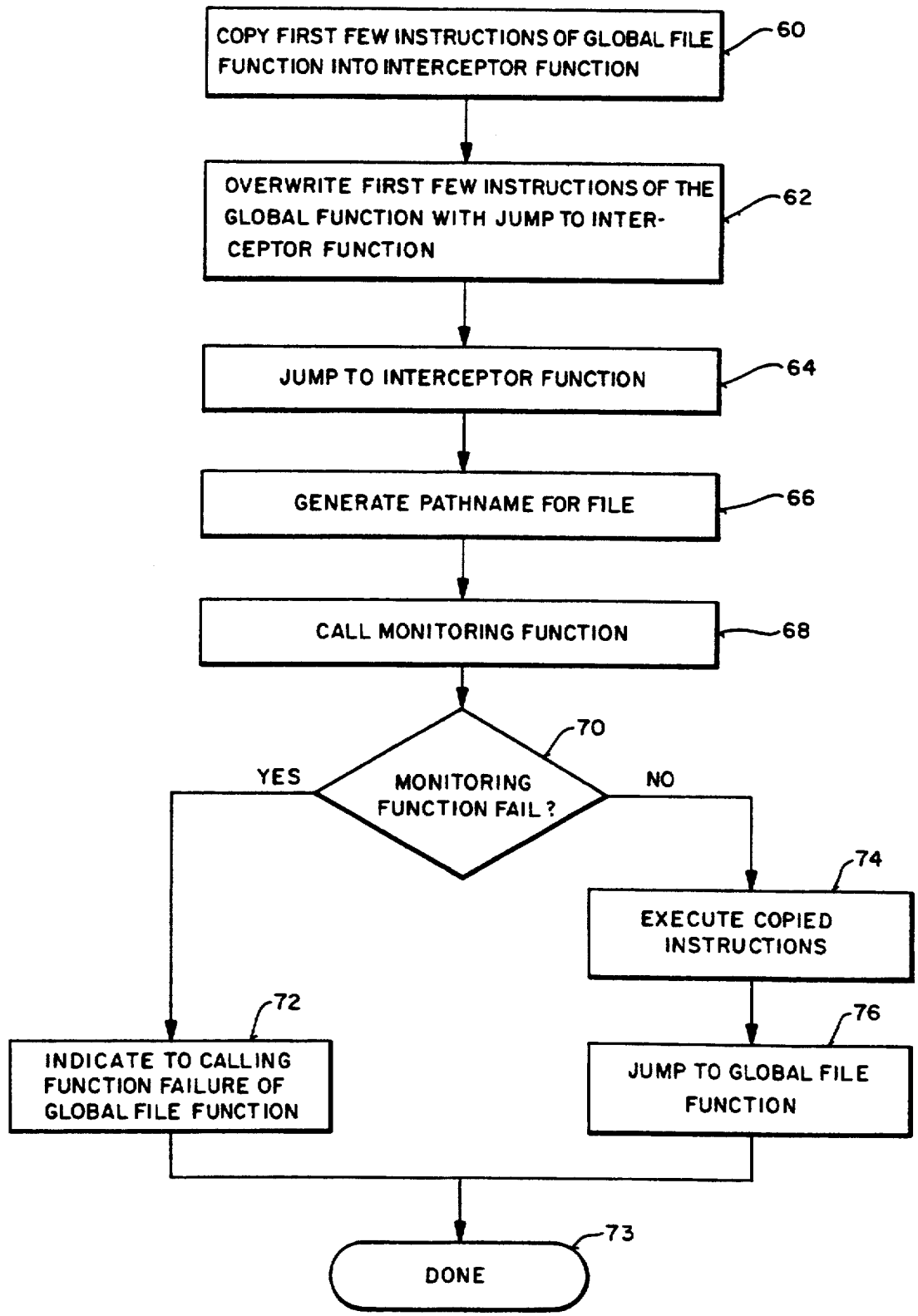

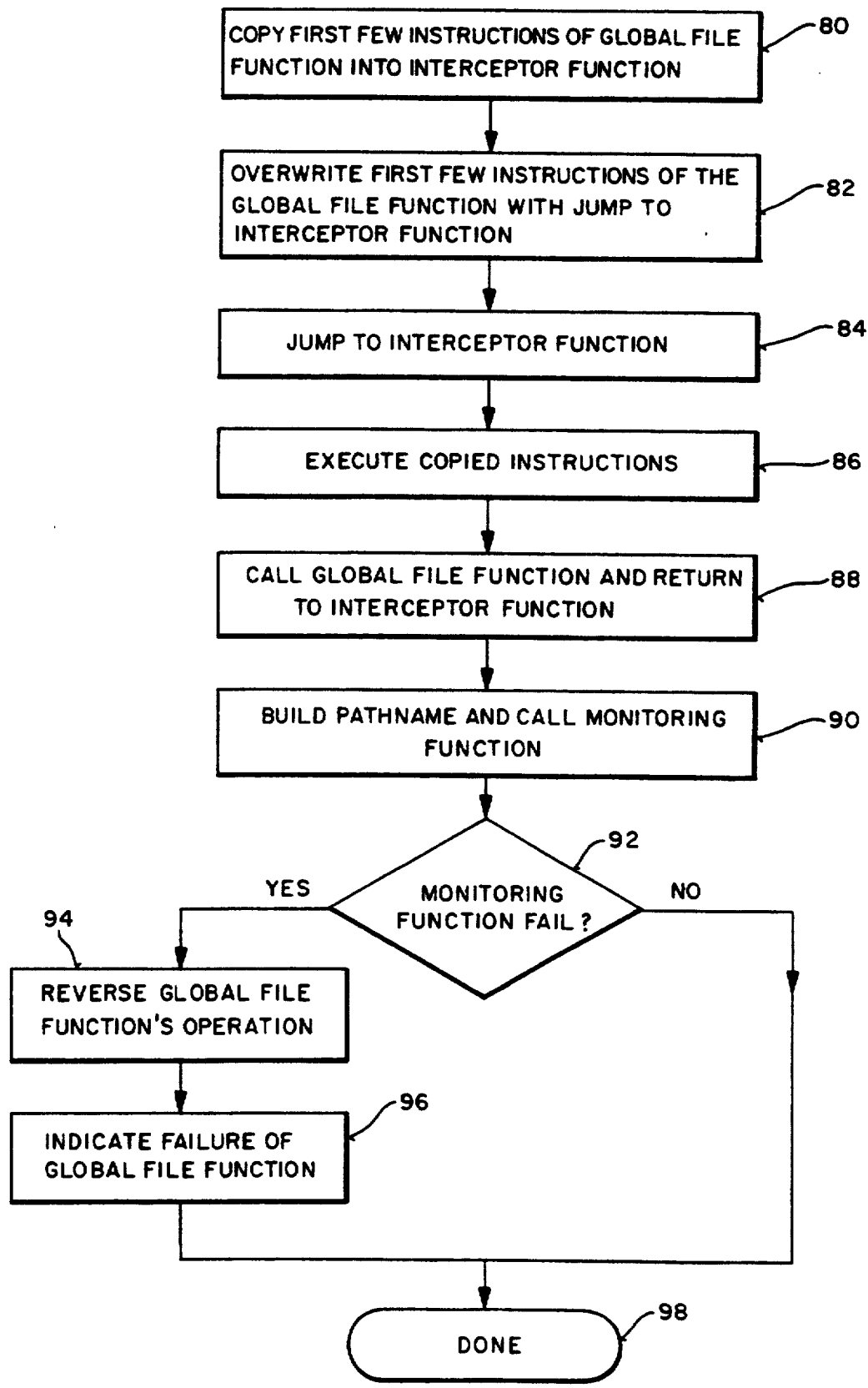

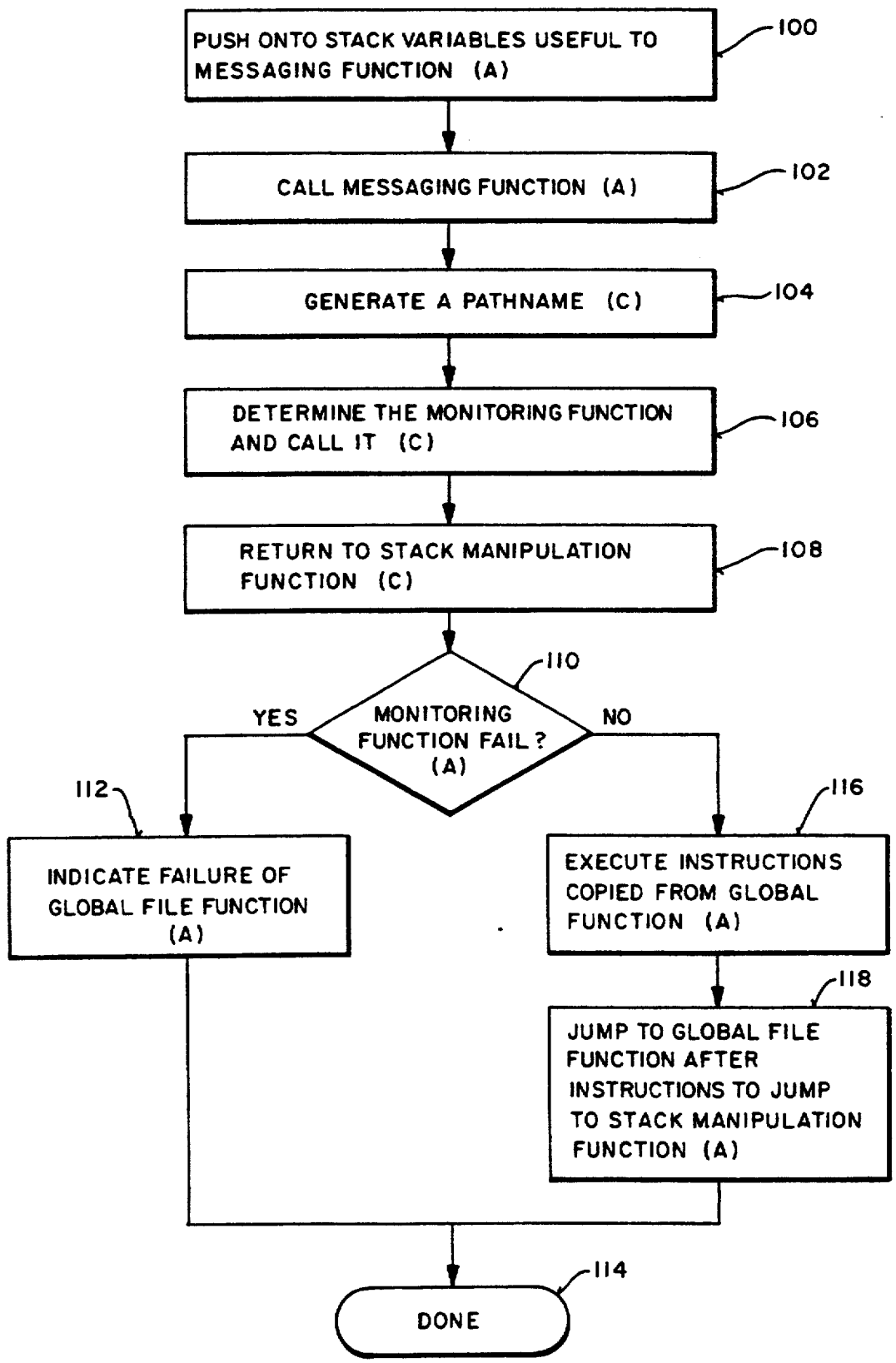
FIG_5

METHOD OF INTERCEPTING A GLOBAL FUNCTION OF A NETWORK OPERATING SYSTEM AND CALLING A MONITORING FUNCTION

FIELD OF THE INVENTION

The present invention relates to a method for enhancing the functionality of operating systems. In particular, the present invention relates to a method of intercepting global functions to allow new monitoring functions to interface with the operating system.

BACKGROUND OF THE INVENTION

Within computers and computer networks, operating system functionality is typically increased by adding software that takes over software interrupts generated by the operating system. For example, virus checkers are added to existing disk operating systems using terminate and stay resident programs (TSR). TSRs monitor software interrupts and activate virus checking programs when appropriate.

A disadvantage of TSRs is that they are under the control of individual users. Thus, a single user may thwart the enhanced DOS functions simply by removing the TSR from a single computer.

Functions implemented by network operating systems cannot be overcome by a single user because the network server is typically secured. Enhancing the functionality of some network operating systems is difficult however, because they do not use software interrupts.

SUMMARY OF THE INVENTION

Accordingly, it is an object of the present invention to provide a method of increasing the functionality of operating systems.

Another object of the present invention is to increase the functionality of operating systems that do not utilize software interrupts.

Still another object of the present invention is to provide an interface between existing operating systems and new software intended to enhance the functionality of the operating system.

The method of the present invention enhances the functionality of operating systems and provides an interface by intercepting calls to global functions. The first few instructions of the global function are overwritten with an instruction to jump to an interceptor function. When jumped to the interceptor function which calls a monitoring function, which performs some analysis; analysis that was not performed by the original operating system. Afterward, the interceptor function returns to the global function.

Other objects, features, and advantages of the present invention will be apparent from the accompanying drawings and the detailed description that follows.

BRIEF DESCRIPTION OF THE FIGURES

The present invention is illustrated by way of example and not limitation in the figures of the accompanying drawings in which references indicate similar elements and in which:

FIG. 1 is a block diagram of a computer network.
FIG. 2 is a block diagram of a computer.
FIG. 3 is a flowchart of the method of intercepting a global file function to activate a file monitoring function.
FIG. 4 a flowchart of an alternative method of intercepting a global file function.
FIG. 5 is a detailed flow chart of the interceptor function.

DETAILED DESCRIPTION

FIG. 1 illustrates in block diagram form a computer network 10. As will be described in detail below, server 20 includes the interceptor function of the present invention. The interceptor function serves as an interface between the old network operating system and the new and enhanced monitoring functions being added. In preparation of interception, the first few instructions of the global function are overwritten with an instruction to jump to the interceptor function. Upon entry, the interceptor function calls the monitoring function, which performs some analysis.

Computer network 10 includes several computers 20, 22, 24, and 26 which share input/output resources, such as printer 28 and fax machine 30. The number of devices included within network 10 is limited by the network operating system utilized, and not by the present function.

Each device 22, 24, 26, 28, and 30 within network 10 is connected to computer 20, also called server 20. Computer network 10 uses a star topology. The present invention is not limited to star topologies; however. The present invention is equally applicable to other topologies, such as ring and bus.

Server 20 is devoted to the execution of network operating system software. The network operating system software allows computers 22, 24, and 26 to share printer 28 and fax machine 30, exchange electronic mail and to share files. Network operating system include file manipulation functions such as open file, close file, rename file, create and open file and delete file, which are global. That is, the file manipulation functions are available to all functions running within the network operating system. Additionally, many other network operating system functions are global, e.g., receive packet.

FIG. 2 illustrates computer 20. Computer 20 includes monitor 32 for visually displaying information to a computer user. Keyboard 34 and mouse 36 allow the computer user to communicate with central processing unit (CPU) 38. In the preferred embodiment of the present invention, CPU 38 is a microprocessor including an internal stack, such as one of the 386 family of microprocessors. Server 20 includes random access memory (RAM) 40 and a disk drive 42, which reads floppy disks. Computer 20 functions as a server by storing and executing network operating system software. In the preferred embodiment, server 20 executes Novell's Netware ™ version 3.10 or version 3.11. Netware ™ does not use software interrupts.

In alternative embodiments, the intercepting software may operate with other types of operating systems, such as Microsoft Windows ™.

The interceptor function is stored in server 20, either within internal memory or on a floppy disk. The interceptor function alters the operation of server 20 and enhances its functionality by allowing monitoring functions to be added to operating systems.

FIG. 3 illustrates in flow chart form the interceptor function, which is used to intercept a global function of an operating system that does not use software interrupts. After interception, the interception function calls a monitoring function, such as a virus checker, a file indexer, or an accounting function. The interceptor function may be used with global file functions such as open file, close file, rename file, delete file, and create and open file, as well as other global functions unrelated to file operations. The global function to be intercepted depends upon the type of monitoring functions being activated. For example, a virus checker will be concerned with global functions such as open file, close file, rename file, delete file, and create and open file. In contrast, an accounting function may be concerned only with open window or close window functions.

One interceptor function is required per global function being intercepted. The reason for this will be apparent from the discussion of FIG. 3.

The preferred interceptor function includes two programs, one written in assembly language and the other in the high level language of the operating system. The preferred operating system, Novell's Netware TM, is written in C.

The method begins in step 60. Step 60 prepares for interception by copying the first few instructions of the global function. In the preferred embodiment, the instructions are copied at the assembly language level, rather than at a higher language level, to optimize performance. The number of instructions copied depends upon step 62. The instructions are copied into the interceptor function at an appropriate location, to be described below.

In the preferred embodiment, the addresses of global functions are found using the dynamic linker of the operating system. After locating the the global function, the first few assembly instructions are examined using a debugger. Also a breakpoint should be set at the location of the global function. The operating system should then be allowed to execute until the global function is called. At that point the first parameter on the stack will contain the return address of the calling function. Examination of the return code will reveal stack clean-up instructions. Examination of the clean-up instructions will yield the number of parameters placed on the stack by the calling function. Some operating systems may deviate; however the number of parameters must be known by the interceptor function to guarantee that the global function executes properly when it is recalled by the interceptor function. Further, these parameters may be of interest to the monitoring function.

In step 62 the first bytes of assembly level instructions of the global function are overwritten with an instruction to jump to the interceptor function. The number of instructions that must be overwritten determines the number of instructions that are copied in step 60.

Steps 60 and 62 may be accomplished using a single assembly level program, which is called a remapping function.

Whenever a calling function calls the global function a jump to the interceptor function occurs. This is shown in step 64.

If the global function being intercepted is a file function and the monitoring function would like to examine the file, then the interceptor function must generate a pathname. This is necessary, for example, when the monitoring function is a virus checker. Otherwise, a pathname need not be generated.

In step 66 the interceptor function determines the location of the file within the network operating system and uses that information to create a pathname. The location of the file can be determined from information pushed onto the stack by the calling function. That information must be translated into a form useful to the monitoring function, which is written in a high level language, such as C.

In step 68 the monitoring function is called so that it may perform its analysis. In an alternative embodiment, monitoring functions may register for a port. By using multiple ports more than one function may monitor a single global function or a monitoring function may monitor multiple global functions. Calling monitoring functions will be slightly more complicated, of course, in this embodiment.

The interceptor function expects some indication of the results of the monitoring function. In the preferred embodiment, the monitoring function stores a flag in one of the general registers of CPU 38. In step 70 the interceptor examines the contents of that general register.

If the monitoring function fails, the interceptor function branches to step 72. There the interceptor function indicates to the calling function that the global function has failed. Note that the global function is never called and is never allowed to execute. This is desirable when the monitoring function is a virus checker that discovers a virus in a file, and the function was on open file function and the file should not be opened. Having completed its task the interceptor function branches to step 73 from step 72.

On the other hand, if the monitoring function was successful, then the interceptor function branches to step 74 from step 70. There the interceptor function prepares to return to the global function by executing those instructions copied in step 60.

After completing step 74, the interceptor function jumps to the global function at a point after the instruction to jump to the interceptor file. This is shown in step 76. Once again, having completed its task the interceptor function branches to step 73 from step 76.

An alternative method of intercepting a global function is illustrated in FIG. 4. This method differs from that of FIG. 3 primarily in that the monitoring function is called after execution of the global function. The method of FIG. 4 may be more appropriate for monitoring functions that are concerned only with changes to files; e.g., file indexing functions.

The method of FIG. 4 begins like the method of FIG. 3. Thus, steps 80, 82, and 84 parallel steps 60, 62 and 64.

In step 86 the interceptor function prepares to call the global function by executing those instructions copied from the global function.

In step 88 the interceptor function calls the global function. The interceptor function returns to the global function at a point after the overwritten instructions. The global function returns to the interceptor function after it completes its task.

Upon reentry, in step 90 the interceptor function builds a pathname, if necessary. The interceptor function also places any information of interest to the monitoring function in a structure. Next, the interceptor function calls the monitoring function.

The monitoring function performs its analysis and returns to the interceptor function at step 92. There the success of the monitoring function is examined.

If the monitoring function was unsuccessful, the interceptor function branches to step 94 from step 92. There, if appropriate and possible, the operation of the global function is reversed. For example, if the global function being intercepted is an open file function and the monitoring function is a virus checker then the interceptor function calls the close file function. This prevents infected files from being copied from server 20 onto other computers.

The interceptor function then branches to step 96 to indicate to the calling function that the global function failed. Note that as far as the calling function is aware, the global function never executed.

On the other hand, if the monitoring function was successful, the interceptor function branches to step 98 from step 92, its tasks complete.

FIG. 5 illustrates in greater detail an interceptor function corresponding to FIG. 3. The interceptor function includes two functions: a stack manipulator function and a messaging function. The stack manipulator function is written in assembly language and communicates with other functions via the stack, without destroying the information placed on the stack by the calling function. Steps corresponding to the stack manipulator function are indicated by "(A)" in the lower right corner. In contrast, steps corresponding to the messaging function are indicated by "(C)" in the lower right corner. This is because the messaging function is preferably written in C. The messaging function generates a pathname for the file to be operated on by the monitoring function, when a pathname is necessary. The messaging function also stores other information of interest to the monitoring function in a structure. With global file functions, information of interest is related to the location of the file to be operated upon and includes information such as volume number, directory number, file number, etc., which is made available on the stack by the stack manipulator function.

FIG. 5 also shows that the stack manipulator function "sandwiches" the messaging function. In other words, the stack manipulator function includes two segments, one which precedes the messaging function and another which follows the messaging function.

Interception of the global function begins in step 100 with the stack manipulation function. There the stack manipulation function pushes a number of variables onto the stack to be used by the messaging function. Many of these variables are already on the stack, having been pushed by the calling function. The stack manipulation function pushes these variables onto the stack a second time to insure that the messaging function can return to the stack manipulation function.

In step 102 the stack manipulation function calls the messaging function. The call implicity pushes onto the stack a return address for the stack manipulation function.

The first task of the messaging function is to generate a pathname, as shown in step 104, when the global function is a file function.

In generating the pathname, the preferred embodiment of the messaging function uses a global function of Novell's Netware, called MapDirectoryNumber-ToPath. This function returns a pathname in the form of a pascal string for the directory in which the file resides. The arguments of MapDirectoryNumberToPath are volumenumber, dirnumber, namespace, CP, buffer length and &plen. The argument buffer length is the length of the buffer to be used by the function. &plen is a pointer to an integer that returns the number of bytes of the buffer used. CP is a pointer to a buffer where the function will place the generated path name.

The messaging function converts the pascal string received from MapDirectoryNumberToPath into a C string. Afterward, the file name is appended to the end of directory path.

After building the path name, the messaging function fills a structure to be utilized by the monitoring function. The information stored in the structure depends upon the global function that is being intercepted, and the calling function.

In step 106 the messaging function determines which monitoring function should be called and calls it.

The messaging function returns to the stack manipulation function in step 108.

In step 110 the stack manipulation function determines the success of the monitoring function. If the monitoring function failed the stack manipulation function branches to step 112 from step 110. There the stack manipulation function indicates the failure of the global function to the calling function. As a result, the global function is never called and is never allowed to execute. Having completed its task the stack manipulation function branches to step 114 from step 112.

If on the other hand, the monitoring function is successful, then the stack manipulation function branches to step 116 from step 110. There the stack manipulation function executes those instructions copied from the global function. Afterward, the stack manipulation function jumps back to the global function to the first byte immediately following the jump to the stack manipulation function. The interceptor function then ends with step 114.

Whenever monitoring functions are unloaded or disabled, the interceptor function should also be disabled. This is done by entering the global function and overwriting the instructions to jump to the interceptor function with the original instructions. This procedure is referred to as "unmapping."

Thus, a method of enhancing operating systems has been described. The present invention provides an interface between the old operating system and functions added to enhance functionality. This is done by intercepting global functions existent on the operating system and then calling new monitoring functions.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. In a digital computer executing network operating system software, a method of intercepting a global function of the network operating system and calling a monitoring function, comprising the computer implemented steps of:
   a) calling the global function from a calling function;
   b) jumping to an interceptor function from the global function;
   c) calling the monitoring function from the interceptor function;
   d) the monitoring function determining whether the global function should be executed, the monitoring function indicating success if the global function should be executed and indicating failure if the global function should not be executed;

e) returning to the interceptor function from the monitoring function;

f) if the monitoring function failed indicating failure of the global function to the calling function; and g) if the monitoring function was successful jumping from the interceptor function to the global function at an instruction after an instruction to jump to the interceptor function.

2. The method of claim 1 prior to the jumping to the interceptor function comprising the steps of:

a) copying a first set of instructions of the global function into the interceptor function; and b) overwriting the first set of instructions of the global function with an instruction to jump to the interceptor function.

3. The method of claim 1 further comprising the step of overwriting the instruction to jump to the interceptor function with the first set of instructions of the global function when the monitoring function is disabled.

4. In a digital computer executing network operating system software, a method of intercepting a global function of the network operating system and calling a monitoring function, the method comprising the computer implemented steps of:

a) copying a first set of instructions of the global function into an interceptor function;

b) overwriting the first set of instructions of the global function with an instruction to jump to the interceptor function;

c) a calling function calling the global function to perform an operation on a file;

d) jumping to the interceptor function from the global function;

e) calling the monitoring function from the interceptor function;

f) the monitoring function determining whether the global function should be executed, the monitoring function indicating success if the global function should be executed and indicating failure if the global function should not be executed;

g) indicating failure of the global function to the calling function if the monitoring function fails;

h) if the monitoring function is successful;

A) returning to the interceptor function and executing the first set of instructions copied from the global function; and B) jumping from the interceptor function to the global function at an instruction after the instruction to jump to the interceptor function.

5. The method of claim 4 further comprising the step of overwriting the instruction to jump to the interceptor function with the first set of instructions of the global function when the monitoring function is disabled.

6. In a digital computer executing network operating system software, a method of intercepting a global file function of the network operating system and calling a file monitoring function, the method comprising the computer implemented steps of:

a) copying a first set of instructions of the global file function into an interceptor function;

b) overwriting the first set of instructions of the global file function with an instruction to jump to the interceptor function;

c) a calling function calling the global file function to operate on a file;

d) jumping to the interceptor function from the global file function;

e) generating a pathname for the file;

f) calling the file monitoring function from the interceptor function and passing the pathname to the file monitoring function;

g) the file monitoring function determining whether the global file function should be executed, the file monitoring function indicating success if the global file function should be executed and indicating failure if the global file function should not be executed;

h) if the file monitoring function fails indicating failure of the global file function to the calling function;

i) if the file monitoring function is successful:

A) returning to the interceptor function and executing the first set of instructions copied from the global file function; and B) jumping from the interceptor function to the global file function at an instruction after the instruction to jump to the interceptor function.

7. The method of claim 6 wherein the global file function is open file.

8. The method of claim 6 wherein the global file function is close file.

9. The method of claim 6 wherein the global file function is rename file.

10. The method of claim 6 wherein the global file function is delete file.

11. The method of claim 6 wherein the global file function is create and open file.

12. The method of claim 6 further comprising the step of generating a pathname for the file.

13. The method of claim 6 wherein the monitoring function is a virus checker.

14. The method of claim 6 wherein the monitoring function is a file indexer.

15. In a digital computer executing network operating system software, a method of intercepting a global function of the network operating system an calling a monitoring function, the method comprising the computer implemented steps of:

a) copying a first set of instructions of the global function into an interceptor function:

b) overwriting the first set of instructions of the global function with an instruction to jump to the interceptor function:

c) a calling function calling the global function:

d) jumping to the interceptor function from the global function;

e) executing the first set of instructions copied from the global function; and f) jumping from the interceptor function to the global function at an instruction after the instruction to jump to the interceptor function;

g) returning to the interceptor function from the global function;

h) calling the monitoring function from the interceptor function; and i) the monitoring function analyzing the execution of the global function and indicating whether the global function failed to execute successfully:

j) if the monitoring function indicates failure indicating the failure of the global function to the calling function.

16. The method of claim 15 further comprising the steps of:

a) copying the first set of instructions of the global file function into the interceptor function; and b) overwriting the first set of instructions of the global file function with an instruction to jump to the interceptor function.

17. The method of claim 15 further comprising the step of overwriting the instruction to jump to the interceptor function with the first set of instructions of the global file function when the monitoring function is disabled.

* * * * *